(12) United States Patent
Mikhail et al.

(10) Patent No.: US 8,257,883 B2
(45) Date of Patent: Sep. 4, 2012

(54) DURABILITY FOR THE MEA AND BIPOLAR PLATES IN PEM FUEL CELLS USING HYDROGEN PEROXIDE DECOMPOSITION CATALYSTS

(75) Inventors: Youssef M. Mikhail, Sterling Heights, MI (US); Mahmoud H. Abd Elhamid, Grosse Pointe Woods, MI (US); Gayatri Vyas, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 2082 days.

(21) Appl. No.: 11/196,632

(22) Filed: Aug. 3, 2005

(65) Prior Publication Data

US 2007/0031723 A1 Feb. 8, 2007

(51) Int. Cl.
*H01M 4/94* (2006.01)
*H01M 8/10* (2006.01)
*H01M 8/02* (2006.01)

(52) U.S. Cl. ....................................................... 429/526
(58) Field of Classification Search .................. 429/30, 429/38, 44
See application file for complete search history.

(56) References Cited

U.S. PATENT DOCUMENTS

| | | | | |
|---|---|---|---|---|
| 5,840,414 | A | * | 11/1998 | Bett et al. .................... 428/307.7 |
| 6,503,653 | B2 | * | 1/2003 | Rock .................................. 429/35 |
| 2003/0039875 | A1 | * | 2/2003 | Horiguchi et al. ............... 429/26 |
| 2003/0091889 | A1 | * | 5/2003 | Sotomura et al. ............... 429/40 |
| 2004/0038808 | A1 | * | 2/2004 | Hampden-Smith et al. .. 502/180 |
| 2004/0101739 | A1 | * | 5/2004 | Enjoji et al. ..................... 429/40 |
| 2004/0106034 | A1 | * | 6/2004 | Bekkedahl et al. ............. 429/44 |
| 2005/0238873 | A1 | * | 10/2005 | Brady et al. .................... 428/336 |

OTHER PUBLICATIONS

U.S. Appl. No. 11/068,489, filed Feb. 28, 2005, Vyas et al.
U.S. Appl. No. 11/089,525, filed Mar. 24, 2005, Vyas et al.
U.S. Appl. No. 11/089,526, filed Mar. 24, 2005, Vyas et al.

* cited by examiner

*Primary Examiner* — Robert Hodge
*Assistant Examiner* — Stephen Yanchuk
(74) *Attorney, Agent, or Firm* — John A. Miller; Miller IP Group, PLC

(57) ABSTRACT

A fuel cell that employs a decomposition catalyst on one or more of the membrane, bipolar plates or diffusion media layers in the fuel cell that decomposes hydrogen peroxide, and thus reduces the generation of hydroxyl free radicals. In one embodiment, the decomposition catalyst is ruthenium oxide and is deposited on the structure by various processes, such as chemical vapor deposition process.

21 Claims, 1 Drawing Sheet

DURABILITY FOR THE MEA AND BIPOLAR PLATES IN PEM FUEL CELLS USING HYDROGEN PEROXIDE DECOMPOSITION CATALYSTS

BACKGROUND OF THE INVENTION

1. Field of the Invention

This invention relates generally to a fuel cell and, more particularly, to a fuel cell that includes a decomposition catalyst that decomposes hydrogen peroxide to reduce membrane degradation.

2. Discussion of the Related Art

Hydrogen is a very attractive fuel because it is clean and can be used to efficiently produce electricity in a fuel cell. The automotive industry expends significant resources in the development of hydrogen fuel cells as a source of power for vehicles. Such vehicles would be more efficient and generate fewer emissions than today's vehicles employing internal combustion engines.

A hydrogen fuel cell is an electrochemical device that includes an anode and a cathode with an electrolyte therebetween. The anode receives hydrogen gas and the cathode receives oxygen or air. The hydrogen gas is dissociated in the anode to generate free protons and electrons. The protons pass through the electrolyte to the cathode. The protons react with the oxygen and the electrons in the cathode to generate water. The electrons from the anode cannot pass through the electrolyte, and thus are directed through a load to perform work before being sent to the cathode. The work acts to operate the vehicle.

Proton exchange membrane fuel cells (PEMFC) are a popular fuel cell for vehicles. The PEMFC generally includes a solid polymer-electrolyte proton-conducting membrane, such as a perfluorosulfonic acid membrane. The anode and cathode typically include finely divided catalytic particles, usually platinum (Pt), supported on carbon particles and mixed with an ionomer. The catalytic mixture is deposited on opposing sides of the membrane. The combination of the anode catalytic mixture, the cathode catalytic mixture and the membrane define a membrane electrode assembly (MEA). MEAs require certain conditions for effective operation, including proper water management and humidification, and control of catalyst poisoning constituents, such as carbon monoxide (CO).

Several fuel cells are typically combined in a fuel cell stack to generate the desired power. For the automotive fuel cell stack mentioned above, the stack may include about two hundred fuel cells. The fuel cell stack receives a cathode reactant gas, typically a flow of air forced through the stack by a compressor. Not all of the oxygen is consumed by the stack and some of the air is output as a cathode exhaust gas that may include water as a stack by-product. The fuel cell stack also receives an anode hydrogen reactant gas that flows into the anode side of the stack.

The fuel cell stack includes a series of flow field or bipolar plates positioned between the several MEAs in the stack. The bipolar plates include an anode side and a cathode side for adjacent fuel cells in the stack. Anode gas flow channels are provided on the anode side of the bipolar plates that allow the anode gas to flow to the anode side of the MEA. Cathode gas flow channels are provided on the cathode side of the bipolar plates that allow the cathode gas to flow to the cathode side of the MEA. The bipolar plates also include flow channels through which a cooling fluid flows.

The bipolar plates are typically made of a conductive material, such as stainless steel, titanium, aluminum, polymeric carbon composites, etc., so that they conduct the electricity generated by the fuel cells from one cell to the next cell and out of the stack. Metal bipolar plates typically produce a natural oxide on their outer surface that makes them resistant to corrosion. However, the oxide layer is not conductive, and thus increases the internal resistance of the fuel cell, reducing its electrical performance. Also, the oxide layer makes the plate more hydrophobic.

Oxygen permeates through the membrane from the cathode side to the anode side of the fuel cells in the stack, sometimes referred to as oxygen cross-over. The reduction of oxygen on the anode and anode sides of the fuel cell generates hydrogen peroxide. The hydrogen peroxide reacts vigorously with ferric and/or ferrous ions that are generated by corrosion of the bipolar plates. The reaction of hydrogen peroxide and ferrous ions produces hydroxyl free radicals, which degrade the membrane as a result of Fenton's reaction shown below.

$$H_2O_2 + Fe^{2+} \longrightarrow Fe^{3+} + HO^- + HO^* \quad (1)$$

$$RH + OH^* \longrightarrow R^* + H_2O \quad (2)$$

$$R^* + Fe^{3+} \longrightarrow R^+ + Fe^{2+} \quad (3)$$

The degradation of the membrane produces hydrogen fluoride in the fuel cell. The hydrogen fluoride corrodes the bipolar plates, which generates more ferric and ferrous ions, increasing the production of the hydroxyl free radicals, and thus further increasing the degradation of the membrane. This process thus becomes auto-catalytic and a significant degradation of both the membrane and the bipolar plate occurs as a result of the reaction.

SUMMARY OF THE INVENTION

In accordance with the teachings of the present invention, a fuel cell is disclosed that employs a decomposition catalyst deposited on one or more of the membrane, bipolar plates and diffusion media layers in the fuel cell. The decomposition catalyst decomposes hydrogen peroxide, and thus reduces the production of hydroxyl free radicals. In one non-limiting embodiment, the decomposition catalyst is ruthenium oxide and is deposited on the structure by a chemical vapor deposition process.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a fuel cell that employs a decomposition catalyst is merely exemplary in nature, and is in no way intended to limit the invention or its applications or uses.

Figure 1:
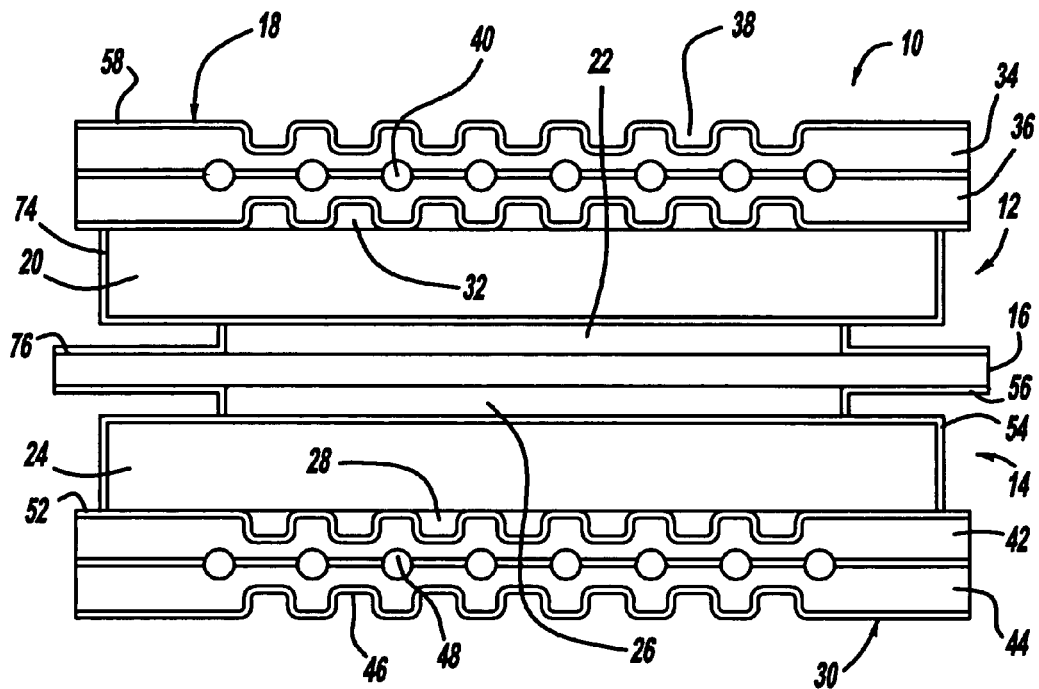
FIG. 1 is a cross-sectional view of a fuel cell in a fuel cell stack that includes a decomposition catalyst deposited on one or more of the bipolar plate, the diffusion media layer or the MEA, according to an embodiment of the present invention.

FIG. 1 is a cross-sectional view of a fuel cell 10 that is part of a fuel stack of the type discussed above. The fuel cell 10 includes a cathode side 12 and an anode side 14 separated by a perfluorosulfonic acid membrane 16. A cathode side diffusion media layer 20 is provided on the cathode side 12, and a cathode side catalyst layer 22 is provided between the membrane 16 and the diffusion media layer 20. Likewise, an anode side diffusion media layer 24 is provided on the anode side 14, and an anode side catalyst layer 26 is provided between the membrane 16 and the diffusion media layer 24. The catalyst layers 22 and 26 and the membrane 16 define an MEA. The diffusion media layers 20 and 24 are porous layers that provide for input gas transport to and water transport from the MEA. Various techniques are known in the art for depositing the catalyst layers 22 and 26 on the diffusion media layers 20 and 24, respectively, or on the membrane 16.

A cathode side flow field plate or bipolar plate 18 is provided on the cathode side 12 and an anode side flow field plate or bipolar plate 30 is provided on the anode side 14. A hydrogen reactant gas flow from flow channels 28 in the bipolar plate 30 reacts with the catalyst layer 26 to dissociate the hydrogen ions and the electrons. Airflow from flow channels 32 in the bipolar plate 18 reacts with the catalyst layer 22. The hydrogen ions are able to propagate through the membrane 16 where they carry the ionic current across the membrane. The end product is water, which does not have any negative impact on the environment.

In this non-limiting embodiment, the bipolar plate 18 includes two sheets 34 and 36 that are stamped and bonded together. The sheet 36 defines the flow channels 32 and the sheet 34 defines flow channels 38 for the anode side of an adjacent fuel cell to the fuel cell 10. Cooling fluid flow channels 40 are provided between the sheets 34 and 36, as shown. Likewise, the bipolar plate 30 includes a sheet 42 defining the flow channels 28, a sheet 44 defining flow channels 46 for the cathode side of an adjacent fuel cell, and cooling fluid flow channels 48. In the embodiments discussed herein, the sheets 34, 36, 42 and 44 are made of an electrically conductive material, such as stainless steel, titanium, aluminum, polymeric carbon composites, etc.

According to the invention, the fuel cell 10 includes a decomposition catalyst that decomposes hydrogen peroxide that forms on the anode and cathode sides of the fuel cell 10, in the manner as discussed above, thereby reducing the Fenton's reaction and the production of hydroxyl free radicals. Without the hydroxyl free radicals, there is a reduction of the degradation of the MEA and the corrosion of the bipolar plate 30. According to one embodiment of the invention, the decomposition catalyst is ruthenium oxide, although other suitable catalysts may be applicable, such as manganese oxide.

The decomposition catalyst is deposited on one or more of the membrane 16 in combination with the catalyst layers 22 and 26, the bipolar plate 18, the bipolar plate 30, the cathode side diffusion media layer 20 and the anode side diffusion media layer 24. Particularly, a decomposition catalyst layer 52 is deposited on the bipolar plate 30, a decomposition catalyst layer 54 is deposited on the anode side diffusion media layer 24, a decomposition catalyst layer 56 is deposited on the anode side of the membrane 16, a decomposition catalyst layer 58 is deposited on the bipolar plate 18, a decomposition catalyst layer 74 is deposited on the cathode side diffusion media layer 20 and a decomposition catalyst layer 76 is deposited on the cathode side of the membrane 16. It is desirable that the decomposition catalyst be deposited on all of the bipolar plates 18 and 30, the membrane 16 and the diffusion media layers 20 and 24. However, as a result of costs and the like, a first choice would be to deposit the decomposition catalyst on the bipolar plates 18 and 30, then on the membrane 16 and then on the diffusion media layers 20 and 24, if necessary.

Further, ruthenium oxide is a very hydrophilic material, which helps with water transport out of the flow channels 28 in the bipolar plate 30, and thus reduces water blockage in the flow channels 28. As is well understood in the art, the membranes within a fuel cell need to have a certain relative humidity so that the ionic resistance across the membrane is low enough to effectively conduct protons. During operation of the fuel cell, moisture from the MEAs and external humidification may enter the anode and cathode flow channels. At low cell power demands, typically below $0.2 A/cm^2$, the water accumulates within the flow channels because the flow rate of the reactant gas is too low to force the water out of the channels. As the water accumulates, it forms droplets that continue to expand because of the hydrophobic nature of the plate material, possibly closing off the flow channel. Therefore, the ruthenium oxide layer reduces the chance of water blocking the flow channels.

Any suitable technique can be used for depositing the decomposition catalyst on the structures referred to above, including, but not limited to, cold sputtering, chemical vapor deposition processes, dipping the structure in a solution of ruthenium oxide and then baking in an oven, etc. In one embodiment, the decomposition catalyst is deposited on the particular structure to a thickness in the range of 50-1000 nm.

Also, when the decomposition catalyst layer 52 is deposited on the bipolar plate 30, it can deposited on both sides of the sheets 42 and 44 where the cooling fluid flow channels 48 are provided so that the sheets 42 and 44 do not need to be welded together. Likewise, when the decomposition catalyst layer 58 is deposited on the bipolar plate 18, it can deposited on both sides of the sheets 34 and 36 where the cooling fluid flow channels 40 are provided so that the sheets 34 and 36 do not need to be welded together. This is because the ruthenium oxide provides a good ohmic contact between the sheets for the conduction of electricity. Therefore, instead of the laser welding that would provide the electrical contact between the sheets in the prior art, the sheets need only be sealed around the edges to connect the sheets.

Figure 2:
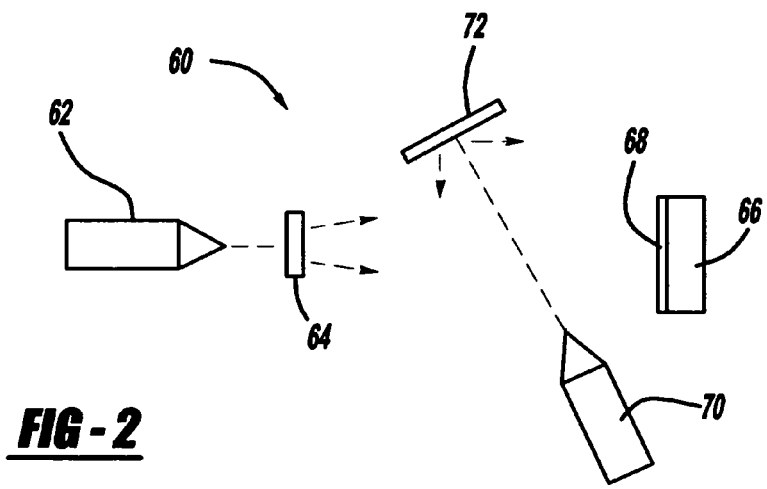
FIG. 2 is a plan view of a system for depositing the decomposition catalyst on the structure in the fuel cell.

FIG. 2 is a plan view of a system 60 for depositing the decomposition catalyst on the various structures discussed above. The system 60 is intended to represent any of the techniques mentioned above, including, but not limited to, physical vapor deposition processes, chemical vapor deposition processes, thermal spraying processes and sol-gel. In the system 60, an electron gun 62 heats a material 64 that causes the material 64 to be vaporized and deposited on a substrate 66, representing the structure, to form a coating 68 of the catalyst thereon. In another process, the system 60 includes an ion gun 70 that directs a beam of ions to a sputtering surface 72 that releases material, such as ruthenium oxide, to deposit the coating 68.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A fuel cell comprising:
   at least one bipolar plate;
   an MEA including a catalyst layer; and
   a diffusion media layer positioned between the MEA and the at least one bipolar plate, wherein each of the at least one bipolar plate, the diffusion media layer and the MEA include a decomposition catalyst that decomposes hydrogen peroxide, where the decomposition catalyst is formed as a layer on the at least one bipolar plate, the MEA and the diffusion media layer.

2. The fuel cell according to claim 1 wherein the decomposition catalyst is ruthenium oxide.

3. The fuel cell according to claim 1 wherein the at least one bipolar plate and the diffusion media layer are on an anode side and/or the cathode side of the fuel cell.

4. The fuel cell according to claim 1 wherein the decomposition catalyst is deposited by a chemical vapor deposition process.

5. The fuel cell according to claim 1 wherein the decomposition catalyst is deposited to a thickness in the range of 50-1000 nm.

6. The fuel cell according to claim 1 wherein the bipolar plate is made of a material selected from the group consisting of stainless steel, titanium, aluminum and a carbon polymer.

7. The fuel cell according to claim 1 wherein the decomposition catalyst is electrically conductive.

8. The fuel cell according to claim 7 wherein the bipolar plate includes two sheets positioned against each other and defining cooling fluid flow channels therebetween, wherein a layer of the decomposition catalyst is provided between the sheets.

9. A fuel cell comprising:
an anode-side bipolar plate; and
an MEA, including a catalyst layer, said bipolar plate and said MEA including a layer of ruthenium oxide facing the MEA for decomposing hydrogen peroxide.

10. The fuel cell according to claim 9 wherein the ruthenium oxide layer is deposited by a chemical vapor deposition process.

11. The fuel cell according to claim 9 wherein the ruthenium oxide layer is deposited to a thickness in the range of 50-1000 nm.

12. The fuel cell according to claim 9 wherein the bipolar plate is made of a material selected from the group consisting of stainless steel, titanium, aluminum and a carbon polymer.

13. The fuel cell according to claim 9 wherein the ruthenium oxide layer is electrically conductive.

14. The fuel cell according to claim 13 wherein the bipolar plate includes two sheets positioned against each other and defining cooling fluid flow channels therebetween, wherein the ruthenium oxide layer is also provided between the sheets.

15. A fuel cell stack including a stack of fuel cells, said stack comprising:
a plurality of bipolar plates;
a plurality of MEAs; each including a catalyst layer; and
a plurality of diffusion media layers positioned between the MEA and the bipolar plates, wherein all of the of the bipolar plates, the diffusion media layers and the MEAs include a ruthenium oxide layer that decomposes hydrogen peroxide.

16. The fuel cell stack according to claim 15 wherein the ruthenium oxide layer is deposited on an outer surface of the bipolar plates, the diffusion media layers and the MEAs.

17. The fuel cell stack according to claim 16 wherein the ruthenium oxide layer is deposited by a chemical vapor deposition process.

18. The fuel cell stack according to claim 16 wherein the ruthenium oxide layer is deposited to a thickness in the range of 50-1000 nm.

19. The fuel cell stack according to claim 15 wherein the bipolar plate is made of a material selected from the group consisting of stainless steel, titanium, aluminum and a carbon polymer.

20. the fuel cell stack according to claim 15 wherein the ruthenium oxide layer is electrically conductive.

21. The fuel cell stack according to claim 19 wherein the bipolar plate includes two sheets positioned against each other and defining cooling fluid flow channels therebetween, wherein the ruthenium oxide layer is also provided between the sheets.

* * * * *